United States Patent
Kitajima et al.

(12)

(10) Patent No.: US 6,641,501 B2
(45) Date of Patent: Nov. 4, 2003

(54) CONTROL APPARATUS FOR HYBRID VEHICLE

(75) Inventors: Shinichi Kitajima, Utsunomiya (JP); Shigetaka Kuroda, Utsunomiya (JP); Atsushi Izumiura, Utsunomiya (JP); Atsushi Matsubara, Utsunomiya (JP); Takashi Kiyomiya, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/096,642

(22) Filed: Mar. 14, 2002

(65) Prior Publication Data

US 2002/0142884 A1 Oct. 3, 2002

(30) Foreign Application Priority Data

Mar. 28, 2001 (JP) .................................. P2001-092648

(51) Int. Cl.[7] .................................................. B60K 1/02
(52) U.S. Cl. ................................. 477/3; 477/7; 701/22
(58) Field of Search ........................... 477/2, 3, 7, 15, 477/17, 107, 110; 701/22

(56) References Cited

U.S. PATENT DOCUMENTS 6,278,915 B1 * 8/2001 Deguchi et al. ............ 477/3 X
6,301,529 B1 * 10/2001 Itoyama et al. ........... 477/15 X
6,314,346 B1 * 11/2001 Kitajima et al. ............ 701/22
6,379,282 B1 * 4/2002 Aoki ...................... 477/110 X
6,524,216 B2 * 2/2003 Suzuki et al. ................ 477/3

FOREIGN PATENT DOCUMENTS

| JP | 405038956 | * 2/1993 | ............... 477/2 |
| JP | 406080048 | * 3/1994 | ............... 477/3 |
| JP | 7-123509 | 5/1995 | |

* cited by examiner

*Primary Examiner*—Charles A. Marmoh
*Assistant Examiner*—Ha Ho
(74) *Attorney, Agent, or Firm*—Armstrong, Westerman & Hattori, LLP

(57) ABSTRACT

A hybrid vehicle control apparatus is provided, wherein an unpleasant sensation is not imparted to a driver depressing an accelerator pedal at the time of departure. In a hybrid vehicle control apparatus with an engine and a motor as the drive sources, and a battery for storing electrical energy from the engine or the kinetic energy of the vehicle converted by the motor, the vehicle is provided with an automatic transmission. Moreover, there is provided a discharge suppression mode which suppresses discharge from the remaining battery charge detected by a battery ECU, and a charge/discharge permit mode which permits charge/discharge of the battery. At a time of vehicle departure, departure assistance is performed only when a degree of throttle opening showing an acceleration intention of the driver exceeds a determination threshold which is larger than a determination threshold for at the time of the discharge/charge permit mode.

6 Claims, 11 Drawing Sheets

KPBRGN/KPBRGTH CALCULATION

KPBRGN/KPBRGTH TABLE

MASTTHL/H TABLE

CONTROL APPARATUS FOR HYBRID VEHICLE

BACKGROUND OF THE INVENTION

1. Field of the Invention

The present invention relates to a control apparatus for a hybrid vehicle. In particular, the invention relates to a control apparatus for a hybrid vehicle that can quickly respond to an assistance request by a driver at the time of vehicle departure.

2. Description of the Related Art

Heretofore there is known a hybrid vehicle incorporating a motor in addition to an engine as drive sources for vehicle propulsion.

One type of such a hybrid vehicle is a parallel hybrid vehicle where the drive output from the engine is assisted by the motor. In this parallel hybrid vehicle, for example at the time of acceleration, the drive output from the engine is assisted by means of the motor, while at the time of deceleration, various control is carried out such as performing battery charging by deceleration regeneration, so that the remaining battery charge can be maintained while satisfying the requirements of the driver (for example as shown in Japanese Unexamined Patent Application, First Publication No. Hei 7-123509).

In the above-mentioned hybrid vehicle, in the case where assistance is required in response to the acceleration intention of the driver, the output from the engine is drive assisted by the motor. However, for the acceleration intention of the driver there are various aspects depending on operating conditions. For example, there is the case where immediately after departure from a stopped condition, the driver depresses the accelerator pedal in order to accelerate, or the case where while traveling, the driver depresses the accelerator pedal in order to accelerate.

Incidentally, compared to the case of accelerating while the vehicle is traveling, in the case where immediately after departure, the driver depresses the accelerator pedal in order to accelerate, if there is not a rapid response to the acceleration intention of the driver, the driver suffers an unpleasant sensation. Especially, in the case of a hybrid vehicle which incorporates an automatic transmission, this becomes a problem in that it is not possible to avoid imparting a sluggish feeling with respect to the acceleration intention of the driver, by the amount that the power is transmitted via the automatic transmission. Therefore, there is a problem in that the driver depresses the accelerator pedal more than necessary, and as a result this is adverse to improvement in fuel consumption.

SUMMARY OF THE INVENTION

It is an object of, the present invention to provide a hybrid vehicle control apparatus, wherein an unpleasant sensation is not imparted to a driver depressing an accelerator pedal at the time of departure.

To solve the above-mentioned problems, the present invention is a control apparatus for a hybrid vehicle with an engine (for example, engine E in the embodiment) and a motor (for example, motor M in the embodiment) as the drive sources of the vehicle, and a power storage unit (for example battery 3 in the embodiment) for storing electrical energy from the output of the engine or a part of the kinetic energy of the vehicle which has been converted by the motor, and an automatic transmission (for example the automatic transmission (CVT) T in the embodiment), comprising: a charge condition detection section (for example battery ECU 31 in the embodiment) which detects the charge amount of the power storage unit and determines a mode including at least a charge and discharge permit mode which permits charge and discharge of the power storage unit, and a discharge suppression mode which permits charge and suppresses discharge of the power storage unit; and an assistance determination section (for example the motor assistance determination flag F_MAST in the embodiment) which determines whether or not to perform driving force assistance for the engine by the motor, wherein the assistance determination section has at least a departure assistance determination section (for example the departure assistance request flag F_MASTSTR in the embodiment) which determines departure assistance that performs driving force assistance by the motor at the time of departure of the vehicle, and an acceleration assistance determination section (for example the throttle motor assistance determination flag F_MASTTH in the embodiment) which determines acceleration assistance that performs driving force assistance by the motor at the time of acceleration of the vehicle, and the departure assistance determination section determines to not permit assistance in the case where the charge condition detection section determines the discharge suppression mode (for example step S353 and step S364 in the embodiment) and determines discharge suppression time permit determination (for example step 360 and step 358 in the embodiment) which permits assistance in the discharge suppression mode, and in the case where driving force assistance by the motor is permitted by the discharge suppression time permit determination, the departure assistance is performed by the motor even in the discharge suppression mode. By having such a construction, then even in the case of the discharge suppression mode due to the remaining charge of the power storage unit being low, the acceleration intention of the driver at the time of departure is precisely reflected, so that the vehicle can depart quickly. Therefore, there is the affect that the unpleasant sensation due to tardiness at the time of departure is not imparted to the driver.

In the present invention, the discharge suppression time permit determination by the departure assistance determination section, determines a degree of throttle opening corresponding to an acceleration intention of a driver (for example step S363 in the embodiment), and permits the departure assistance in the case where the degree of throttle opening corresponding to the acceleration intention exceeds a predetermined determination threshold value (for example determination threshold value #THSTRC in the embodiment) which is greater than a departure assistance determination threshold value (for example determination threshold value #THSTR in the embodiment) for at the time of the charge and discharge permit mode. By having such a construction, in the case of the discharge suppression mode, the departure assistance is permitted only in the case where a degree of throttle opening larger than a determination threshold value for at the time of the charge and discharge permit mode, is detected. Hence the discharge amount of the power storage unit can be suppressed to a necessary minimum. Therefore there is the affect that in the discharge suppression mode, a rapid departure corresponding to the acceleration intention of the driver becomes possible, while keeping a drop in the remaining charge of power the storage unit to a minimum.

In the present invention, an assistance amount for the departure assistance in the discharge suppression mode may be determined by a degree of throttle opening or a depression amount of an accelerator pedal. By having such a construction, it is possible to obtain a necessary departure assistance amount from immediately after departure, determined by the degree of throttle opening or the accelerator opening. Therefore, there is the affect that the engine can be quickly assisted corresponding to the accelerator operation by the driver.

In the present embodiment, the assistance determination section may determine the departure assistance when, based on at least engine speed (for example engine speed NE in the embodiment) and vehicle speed (for example vehicle speed VP in the embodiment), the engine speed is less than or equal to a predetermined value (for example departure assistance execution upper limit value #NSTRAST in the embodiment), and the vehicle speed is less than or equal to a predetermined value (for example assistance execution upper limit vehicle speed #VSTRAST in the embodiment). By having such a construction, departure assistance can be executed only at the time of departure. Therefore, there is the affect that a reduction in the remaining charge of the power storage unit due to departure assistance can be kept to a minimum.

In the present invention, in the case where the charge condition detection section determines the discharge suppression mode, the acceleration assistance determination section may determine that the driving force assistance by the motor is not performed. By having such a construction, drive assistance by the motor in the discharge suppression mode can be limited to at the time of departure. Therefore, further reduction in the remaining charge of the power storage unit can be suppressed, so that this does not cause a problem from the point of energy management.

In the present invention, an assistance amount for the departure assistance in the discharge suppression mode may be a constant value (for example assistance value #STRASTCC in the embodiment). By having such a construction, assistance at the necessary assistance amount from immediately after opening the accelerator can be ensured.

DETAILED DESCRIPTION OF THE PREFERRED EMBODIMENTS

Hereunder is a description of embodiments of the present invention with reference to the figures.

Figure 1:
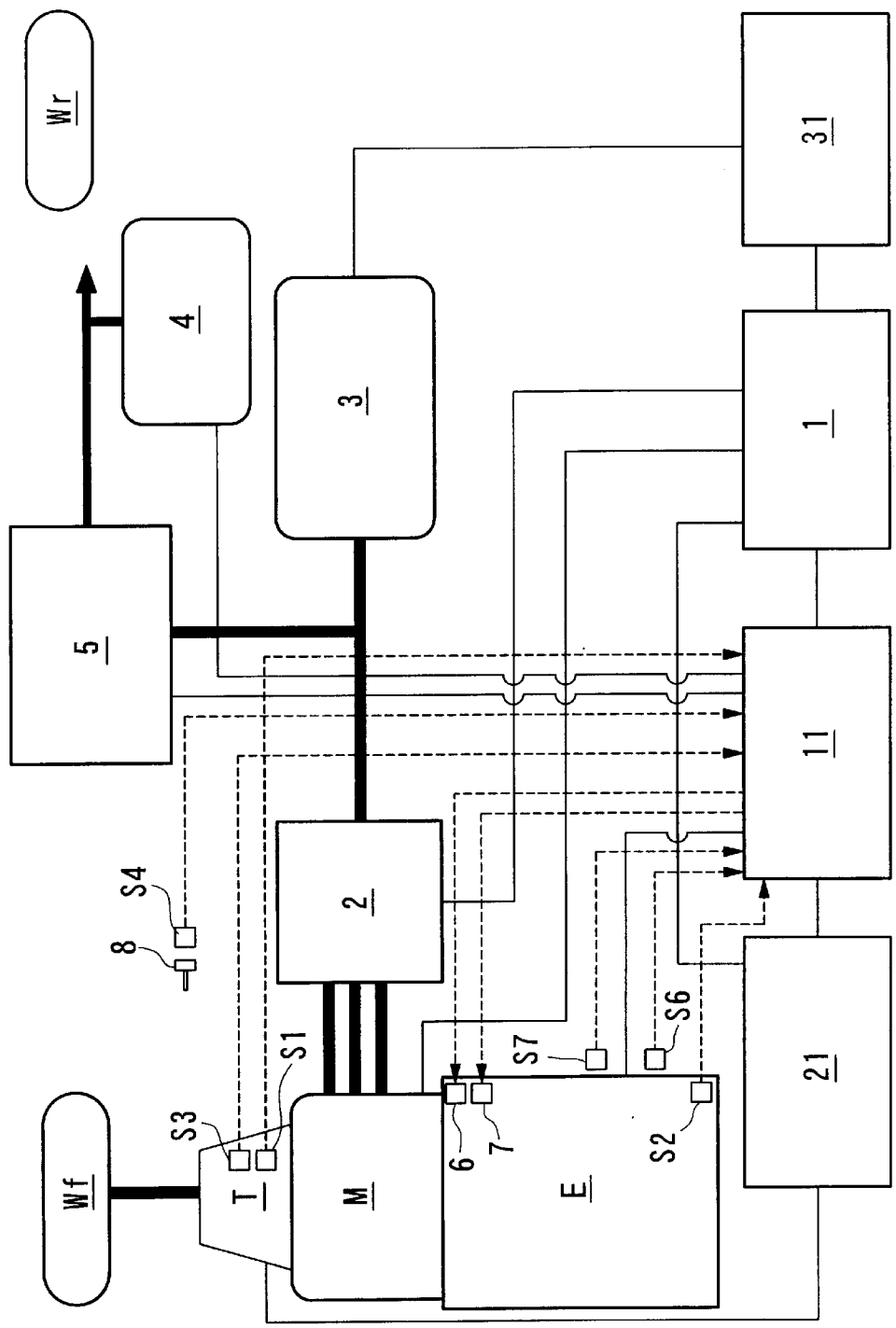
FIG. 1 is a block diagram showing an overall configuration of a hybrid vehicle.

FIG. 1 shows an overall configuration of a parallel hybrid vehicle of an embodiment of the present invention, in which an engine E, a motor M and a transmission T are connected in series. The driving forces from both the engine E and the motor M are transmitted to front wheels Wf serving as drive wheels via an automatic transmission (CVT) T. Furthermore, when a driving force is transmitted to the motor M side from the front wheels Wf at the time of deceleration of the hybrid vehicle, the motor M functions as a generator to produce so called regenerative braking force, and the kinetic energy of the vehicle is collected as electrical energy. The rear wheels are designated as Wr.

The drive and regeneration of the motor M are controlled by a power drive unit 2, which receives control instructions from a motor ECU 1. A battery (storage unit) 3 of a high voltage system for transferring electrical energy to and from the motor M is connected to the power drive unit 2. The battery 3 is constructed from individual modules wherein, for example, a plurality of cells is connected in series, with a plurality of these modules connected in series. Mounted on the hybrid vehicle is a 12 volt auxiliary battery 4 for driving various accessories. This auxiliary battery 4 is connected to the battery 3 via a downverter 5. The downverter 5, which is controlled by an FIECU 11, steps down the voltage of the battery 3 to charge the auxiliary battery 4.

The FIECU 11, in addition to the motor ECU 1 and the downverter 5, controls the operation of a fuel supply amount control device 6 for controlling the amount of fuel supplied to the engine E, the operation of a starter motor 7, and also the ignition timing. Therefore, inputs to the FIECU 11 are: a signal from a vehicle speed sensor S1 which detects the vehicle speed V based on the rotational speed of a drive shaft in the transmission T, a signal from an engine speed sensor S2 which detects engine speed NE, a signal from a gear shift position sensor S3 which detects the shift position of the transmission T, a signal from a brake switch S4 which detects the operation of a brake pedal 8, a signal from a throttle opening sensor S6 which measures the degree of throttle opening (the extent of the throttle opening) TH, and a signal from an air intake passage pressure sensor S7 which detects air intake passage pressure PBGA. Numeral 21 denotes a CVTECU for the CVT control, and numeral 31 denotes a battery ECU that protects the battery 3, and computes the remaining charge SOC of the battery 3.

[Zoning of Remaining Battery Charge SOC]

Next is a description of the before-mentioned remaining battery charge SOC zoning (so called zone separation of remaining charge). Computation of the remaining battery charge is performed in the battery ECU 31, being computed for example using voltage, discharge current, temperature and the like.

To explain an example of this, with zone A (from SOC 40% to SOC 80% to 90%) being a normal use zone as the basis, below zone A there is provided zone B (from SOC 20% to SOC 40%) below this being a temporary use zone, and zone C (from SOC 0% to SOC 20%) further below being an overdischarge zone. Above zone A there is provided zone D (from SOC 80% to 90% to SOC 100%) being an overcharge zone.

Here, a mode for energy management corresponding to zone A being the principal normal use zone, and zone B being the temporary use zone, constitutes a "discharge and charge permit mode for permitting at least discharge and charge", and a mode for energy management corresponding to zone C being the overdischarge zone constitutes "a discharge suppression mode for allowing charge and suppressing discharge". Furthermore, the battery ECU 31 constitutes a charge condition detection device.

[MA (Motor) Basic Modes]

Figure 2:
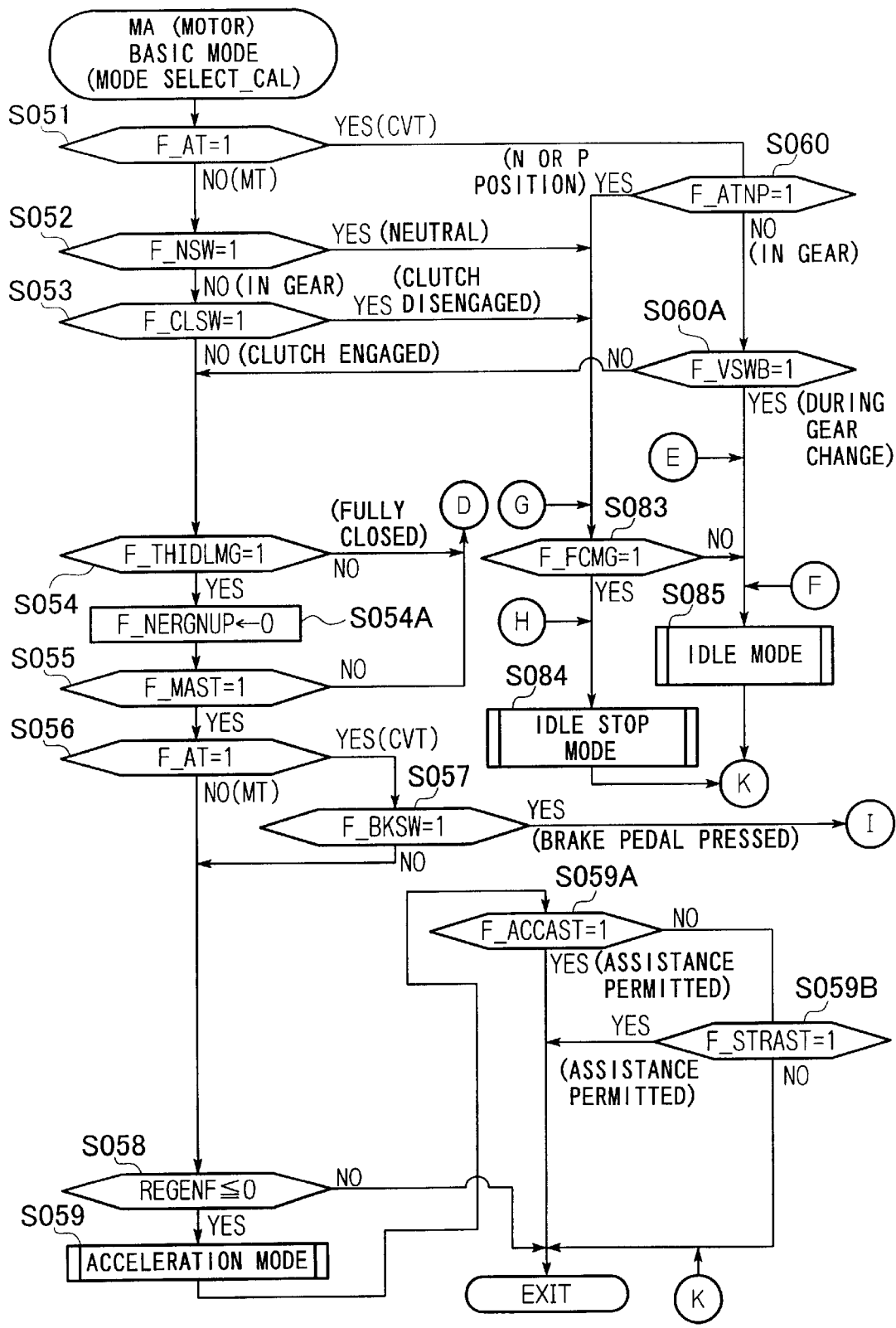
FIG. 2 is a flow chart showing operation of a MA (motor) basic mode.
Figure 3:
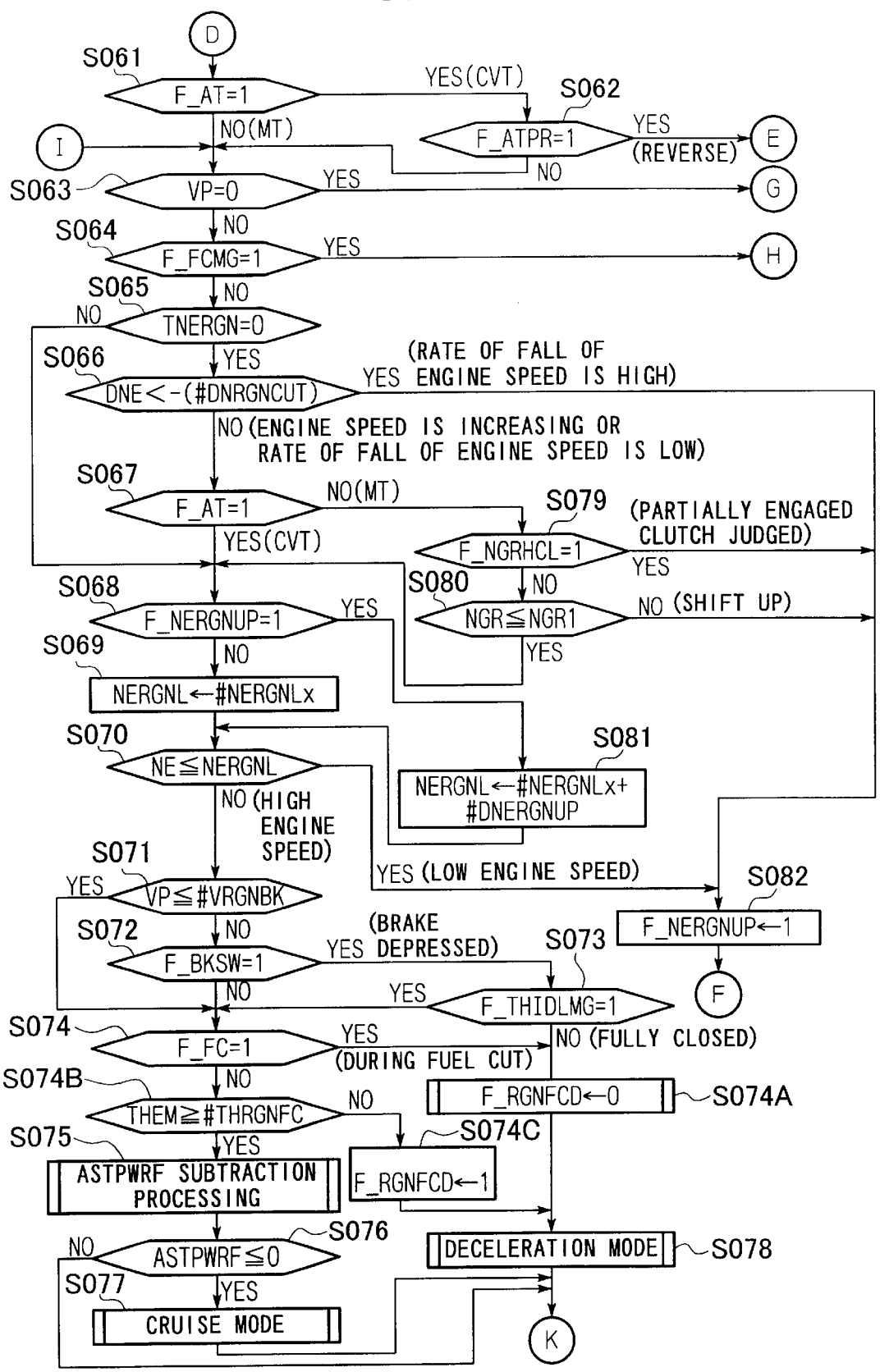
FIG. 3 is a flow chart showing operation of the MA (motor) basic mode.

Next is a description of the MA (motor) basic modes which determine in which mode the motor M will be operated, based on the flow charts shown in FIG. 2 and FIG. 3. This processing is repeated at a predetermined cycle time.

The MA (motor) basic modes are: "idle mode", "idle stop mode", "deceleration mode", "cruise mode" and "acceleration mode". In the idle mode, fuel supply is resumed after fuel supply cut to maintain the engine E in an idle condition, and in the idle stop mode, for example at the time the vehicle is stopped, the engine is stopped in a defined condition. Furthermore, in the deceleration mode, regenerative braking by the motor M is performed. In the acceleration mode, the engine E is drive assisted by the motor M, and in the cruise mode, the motor M is not driven so that the vehicle runs under the driving force of the engine E.

The hybrid vehicle in this embodiment is a CVT vehicle, however, the respective flow charts shown hereunder can also be used jointly for the case of a manual transmission (MT) vehicle.

In step S051 of FIG. 2, it is determined whether an MT/CVT determination flag F_AT is "1" or not. In the case where the determination is "yes" (a CVT vehicle), the flow proceeds to step S060. In the case where the determination is "no" (an MT vehicle), the flow proceeds to step S052.

In step S060 for CVT, it is determined whether an in gear determination flag F_ATNP is "1" or not. In the case where the determination is "yes" (N or P position), the flow proceeds to step S083, and in the case where the determination is "no" (in gear), the flow proceeds to step S060A.

In step S060A, it is determined whether the gear shift is being operated (shift position cannot be determined due to the gear shift being operated) by whether a gear shifted flag F_VSWB is "1" or not. In the case where the determination is "yes" (being shifted), the flow proceeds to step S085, shifts to "idle mode", and control terminates. In idle mode, the engine E is maintained in an idle state. In the case where the determination of step S060A is "no" (not being shifted), the flow proceeds to step S054.

In step S083, it is determined whether an engine stop control execution flag F_FCMG is "1" or not. In the case where the determination of step S083 is "no", the flow shifts to "idle mode" in step S085, and control terminates. In the case where the determination of step S083 is "yes", the flow proceeds to step S084, shifts to "idle stop mode", and control terminates. In the idle stop mode, for example at the time the vehicle is stopped, the engine is stopped in a defined condition.

In step S052, it is determined whether a neutral position determination flag F_NSW is "1" or not. In the case where the determination is "yes" (neutral position), the flow proceeds to step S083, and in the case where the determination is "no" (in gear), the flow proceeds to step S053.

In step S053, it is determined whether a clutch engaged determination flag F_CLSW is "1" or not. In the case where the determination is "yes" (clutch is disengaged), the flow proceeds to step S083, and in the case where the determination is "no" (clutch is engaged), the flow proceeds to step S054.

In step S054, it is determined whether an idle determination flag F_THIDLMG is "1" or not. In the case where the determination is "no" (fully closed), the flow proceeds to step S061, and in the case where the determination is "yes" (not fully closed), the flow proceeds to step S054A.

In step S054A, an engine speed increase flag F_NERGNUP for at the time of partially engaged clutch determination is set to "0", and the flow proceeds to step S055.

In step S055, it is determined whether a motor assistance determination flag F_MAST is "1" or not. This flag determines whether or not the engine E is to be assisted by the motor M. In the case of "1", it means that assistance is required, and in the case of "0", assistance is not required. Here, this motor assistance determination flag F_MAST is set by assistance trigger determination processing.

In the case where the determination of step S055 is "no", the flow proceeds to step S061. In the case where the determination of step S055 is "yes", the flow proceeds to step S056.

In step S056, it is determined whether the MT/CVT determination flag F_AT is "1" or not. In the case where the determination is "yes" (a CVT vehicle), the flow proceeds to step S057, and in the case where the determination is "no" (an MT vehicle), the flow proceeds to step S058.

In step S057, it is determined whether a brake on determination flag F_BKSW is "1" or not. In the case where the determination is "yes" (brake on), the flow proceeds to step S063, and in the case where the determination is "no" (brake off), the flow proceeds to step S058.

In step S058, it is determined whether or not the final charge instruction value REGENF is less than or equal to "0". In the case where the determination is "yes", the flow proceeds to "acceleration mode" in step S059. In acceleration mode, the engine E is drive assisted by the motor M, and the flow proceeds to step S059A. In the case where the determination of step S058 is "no", control terminates.

In step S059A, it is determined whether an assistance permit flag F_ACCAST is "1" or not. In the case where the determination is "yes", control terminates, and in the case where the determination is "no", the flow proceeds to step S059B.

In step S059B, it is determined whether a departure assistance permit flag F_STRAST is "1" or not. In the case where the determination is "yes", or in the case where the determination is "no", control terminates.

In step S061, it is determined whether the MT/CVT determination flag F_AT is "1" or not. In the case where the determination is "no" (an MT vehicle), the flow proceeds to step S063, and in the case where the determination is "yes" (a CVT vehicle), the flow proceeds to step S062.

In step S062, it is determined whether a reverse position determination flag F_ATPR is "1" or not. In the case where the determination is "yes" (reverse position), the flow proceeds to step S085, and in the case where the determination is "no" (position other than reverse), the flow proceeds to step S063.

In step S063, it is determined whether a vehicle speed VP is "0" or not. In the case where the determination is "yes", the flow proceeds to step S083, and in the case where the determination is "no", the flow proceeds to step S064.

In step S064, it is determined whether the engine stop control execution flag F_FCMG is "1" or not. In the case where the determination is "no", the flow proceeds to step S065, and in the case where the determination is "yes", the flow proceeds to step S084.

In step S065, it is determined whether a forced gear change REGEN cancellation determination processing delay timer TNERGN is "0" or not. In the case where the determination is "yes", the flow proceeds to step S066, and in the case where the determination is "no", the flow proceeds to step S068.

In step S066, it is determined whether or not the rate of change of engine speed DNE is less than the negative value of a DNE REGEN cut determination engine speed #DNRGNCUT. Here, the DNE REGEN cut determination engine speed #DNRGNCUT is the rate of change DNE of engine speed NE which becomes a reference for determining whether or not the power generation amount is to be reduced, depending on the rate of change of engine speed DNE.

In the case where the determination of step S066 is that the decrease (rate of fall) of the engine speed NE is high (yes), the flow proceeds to step S082. In step S082, the engine speed increase flag F_NERGNUP for at the time of partially engaged clutch determination is set to "1", and the flow proceeds to step S085.

In the case where the determination of step S066 is that the engine speed NE is increasing (up), or the decrease (rate of fall) of the engine speed NE is low (no), the flow proceeds to step S067.

In step S067, it is determined whether the MT/CVT flag F_AT is "1" or not. In the case where the determination is "no" (an MT vehicle), the flow proceeds to step S079, and in the case where the determination is "yes" (a CVT vehicle), the flow proceeds to step S068.

In step S079, it is determined whether a partially engaged clutch determination flag F_NGRHCL is "1" or not. In the case where the determination is that the clutch is determined to be partially engaged (yes), the flow proceeds to step S082. Furthermore, in the case where the clutch is determined to not be partially engaged (no), the flow proceeds to step S080.

In step S080, the previous gear position NGR and the present gear position NGR1 are compared, and it is determined whether or not there has been a shift up by comparison between the present and previous gear positions.

In the case where the determination of step S080 is that the gear position has been shifted up (no), the flow proceeds to step S082. In the case where the determination of step S080 is that the gear position has not been shifted up between the previous and present times (yes), the flow proceeds to step S068.

In step S068, it is determined whether the engine speed increase flag F_NERGNUP for at the time of partially engaged clutch determination is "1" or not. In the case where the determination is that an increase in engine speed is required at the time of partially engaged clutch determination and the flag is set (=1, yes), the flow proceeds to step S081, an engine speed increase #DNERGNUP for preventing hunting is added to the charge engine speed lower limit value #NERGNLx, which is set for each gear, this added value is set to the charge engine speed lower limit value NERGNL, and the flow proceeds to step S070.

In the case where the determination of step S068 is that an increase in engine speed is not required at the time of partially engaged clutch determination, and the flag is reset (=0, no), the flow proceeds to step S069, the charge engine speed lower limit value #NERGNLx, which is set for each gear, is set to the charge engine speed lower limit value NERGNL, and the flow proceeds to step S070.

Then, in step S070 it is determined whether or not the engine speed NE is less than or equal to the charge engine speed lower limit value NERGNL. In the case where the determination is that it is low engine speed (NE≦NERGNL, yes), the flow proceeds to step S082. In the case where the determination is that it is high engine speed (NE>NERGNL, no), the flow proceeds to step S071.

In step S071, it is determined whether or not the vehicle speed VP is less than or equal to a deceleration mode brake determination lower vehicle speed limit #VRGNBK. Here, this deceleration mode brake determination lower vehicle speed limit #VRGNBK is a value having hysteresis. In the case where the determination is that the vehicle speed VP≦the deceleration mode brake determination lower vehicle speed limit #VRGNBK (yes), the flow proceeds to step S074. In the case where the determination in step S071 is that the vehicle speed VP>the deceleration mode brake determination lower vehicle speed limit #VRGNBK (no), the flow proceeds to step S072.

In step S072, it is determined whether a brake on determination flag F_BKSW is "1" or not. In the case where the determination is "yes", the flow proceeds to step S073, and in the case where the determination is "no", the flow proceeds to step S074.

In step S073, it is determined whether an idle determination flag F_THIDLMG is "1" or not. In the case where the determination is "no" (throttle is fully closed), then in step S074A, a fuel supply cut delay regeneration flag F_RGNFCD is set to "0" and the flow proceeds to "deceleration mode" in step S078 and control terminates. Here fuel supply cut delay regeneration means regeneration processing for applying an appropriate deceleration feeling during a period before entering fuel supply cut. In the case where this processing is performed, the fuel supply cut delay regeneration flag F_RGNFCD is "1", while in the case where processing is not performed, this is "0". Here, in "deceleration mode", regenerative braking is performed by the motor M.

In step S074, it is determined whether a fuel supply cut flag F_FC is "1" or not. This flag is a fuel supply cut determination flag, which becomes "1" when regeneration by the motor M is performed in "deceleration mode" in step S078, and cuts the fuel off. If the determination in step S074 is that deceleration fuel supply cut is in effect (yes), the flow proceeds to step S074A. If the determination in step S074 is that fuel supply cut is not in effect (no), the flow proceeds to step S074B.

In step S074B, it is determined whether or not a current value THEM for the degree of throttle opening is greater than or equal to a deceleration mode throttle determination value #THRGNFC for at a time other than with fuel supply cut. In the case where the determination is "yes", the flow proceeds to step S075, while in the case where the determination is "no", the flow proceeds to step S074C. Here, the deceleration mode throttle determination value #THRGNFC for at a time other than with fuel supply cut, is a value having hysteresis. In step S074C, the fuel supply cut delay regeneration flag F_RGNFCD is set to "1" and the flow proceeds to step S078.

In step S075 subtraction processing of the final assistance instruction value ASTPWRF is performed, and the flow proceeds to step S076.

In step S076, it is determined whether or not the final assistance instruction value ASTPWRF is less than or equal to "0". In the case where the determination is "yes", the flow shifts to "cruise mode" in step S077, and control terminates. In cruise mode the motor M is not driven and the vehicle runs under the driving force of the engine E. Furthermore, the battery 3 may be charged by regenerative operation of the motor M or by using the motor as a generator depending on the running conditions of the vehicle.

In the case where the determination of step S076 is "no", control terminates.

[Assistance Trigger Determination Processing]

Next the assistance trigger determination processing will be described based on the flowcharts shown in FIG. 4 and FIG. 5. This processing is repeated at a predetermined cycle time.

This assistance trigger determination processing is the processing for determining whether or not it is an assistance mode or a cruise mode, and set or reset of a motor assistance determination flag F_MAST is performed.

In step S302, it is determined whether or not the vehicle speed VP is less than or equal to an assistance trigger look up upper limit vehicle speed #VMASTHG. This value #VMASTHG is a value having hysteresis. In the case where the determination is "yes", the flow proceeds to step S305, and in the case where the determination is "no", the flow proceeds to step S303.

In step S303, a cruise power generation amount correction coefficient KTRGRGN in a high vehicle speed region is set to a coefficient #KVTRGRN obtained by table look up, corresponding to the vehicle speed VP, and the flow proceeds to step S333. The coefficient #KVTRGRN is a coefficient having a tendency to increase corresponding to the vehicle speed VP, and is constant in the low vehicle speed region and the high vehicle speed region.

In step S333, the motor assistance determination flag F_MAST is set to "0", and the flow returns from the assistance trigger determination processing, in order to repeat the processing in the above-mentioned predetermined cycle time. In this case, the engine is not drive assisted by the motor.

In step S305, departure assistance trigger determination is performed and the flow proceeds to step S306. This departure assistance trigger determination is the processing for calculating a departure assistance trigger value and the assistance amount separately from the normal assistance amount, at the time of departure, being a high load where the air intake passage pressure PBG is greater than or equal to a predetermined pressure, for improving the departure performance. As a result of this processing, in the case where it is determined that the departure assistance control is necessary, a departure assistance request flag F_MASTSTR (departure assistance determination section) is set to "1". This will be explained later.

In step 306, it is determined whether an energy storage zone C flag F_ESZONEC (indicating that the remaining charge is less than or equal to about 20%) is "1" or not. In the case where the determination is "yes", the flow proceeds to step S307, and in the case where the determination is "no", the flow proceeds to step S311.

In step S307, it is determined whether the departure assistance request flag F_MASTSTR is "1" or not. This departure assistance request flag F_MASTSTR is set in step S305. In the case where in step S307 the determination is "yes", the flow proceeds to step S347, and in the case where the determination is "no", the flow proceed to step S308.

In step S347, the cruise power generation amount subtraction coefficient KTRGRGN is set to "0", and in step S348, the motor assistance determination flag F_MAST is set to "1", and the processing is repeated. As a result, the engine is drive assisted by the motor.

In step S308, it is determined whether or not a final assistance instruction value ASTPWRF is less than or equal to "0". That is, it is determined if the previous value was positive or negative. In the case where the determination is "yes", the flow proceeds to step S333, and in the case where the determination is "no", the flow proceeds to step S311.

In step S311, calculation of a throttle assistance trigger correction value DTHAST is performed, and the flow proceeds to step S312. This correction value calculation is for determining an increased amount of an assistance trigger threshold value, in the case where the remaining battery charge is small, or there is a load due to an air conditioner or the like.

Figure 8:
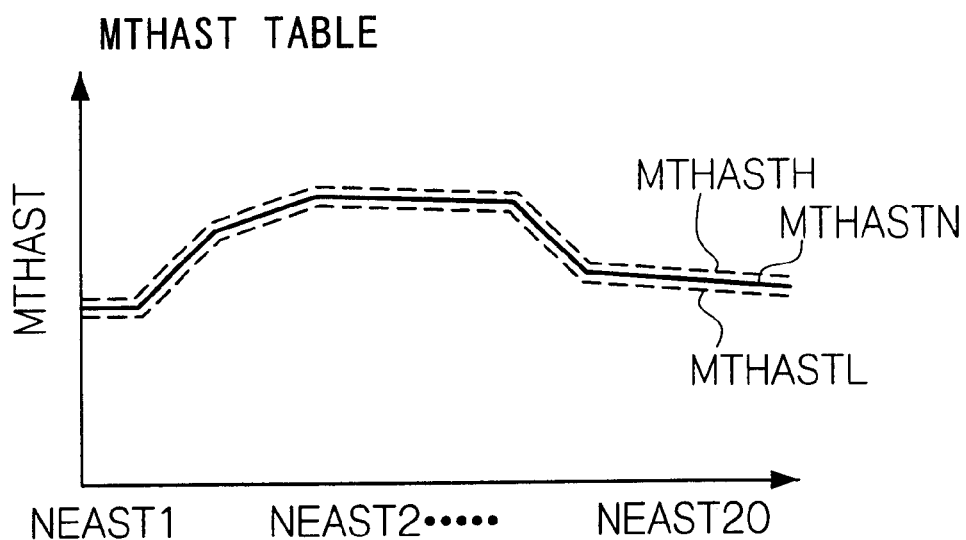
FIG. 8 is a graph showing a threshold value MTHAST table.

In step S312, a threshold value #MTHASTN, being a reference for the throttle assistance trigger, is looked up from a throttle assistance trigger table, and the flow proceeds to step S313. In this throttle assistance trigger table, as shown in FIG. 8 the threshold value MTHASTN for the degree of throttle opening, being the basis of a determination of whether or not the motor assistance is applied at engine speed NE, is determined.

In step S313, the correction value DTHAST computed in the aforementioned step S311 is added to the throttle assistance trigger reference threshold value MTHASTN obtained in step S312 to obtain a high throttle assistance trigger threshold value MTHASTH, and the flow proceeds to step S314.

In step S314, an upper limit value #MTHHAST is looked up from a throttle assistance trigger upper limit table, corresponding to the engine speed NE, and set to the throttle assistance trigger upper limit value MTHHASTN, and the flow proceeds to step S315. In step S315, it is determined whether or not the high throttle assistance trigger threshold value MTHASTH is greater than or equal to the throttle assistance trigger upper limit value MTHHASTN. In the case where the determination is "yes", the flow proceeds to step S316, and in the case where the determination is "no", the flow proceeds to step S317.

In step S316, the high throttle assistance trigger threshold value MTHASTH is set to the throttle assistance trigger upper limit value MTHHASTN, and the flow proceeds to step S317.

In step S317, a difference #DMTHAST for setting the hysteresis is subtracted from the high throttle assistance trigger threshold value MTHASTH to obtain a low throttle assistance trigger threshold value MTHASTL, and the flow proceeds to step S318.

In step S318, it is determined whether or not the current value THEM for the degree of throttle opening is greater than or equal to the throttle assistance trigger threshold value MTHAST. In the case where the determination is "yes", the flow proceeds to step S334, and in the case where the determination is "no", the flow proceeds to step S319. The throttle assistance trigger threshold value MTHAST in this case is a value having hysteresis.

In step S334, a throttle motor assistance determination flag F_MASTTH (acceleration assistance determination section) is set to "1", and the flow proceeds to step S347, and in step S319, the throttle motor assistance determination flag F_MASTTH is set to "0", and the flow proceeds to step S320. In the case where the throttle motor assistance determination flag F_MASTTH is "1", this means that the degree of throttle opening TH is an opening for requesting motor assistance, and in the case where the throttle motor assistance determination flag F_MASTTH is "0", this means that the degree of throttle opening TH is not an opening for requesting motor assistance. In the case where the throttle motor assistance determination flag F_MASTTH is "0", it is further determined hereinafter whether or not assistance is to be performed, by means of the air intake passage pressure PB.

In step S320 it is determined whether a MT/CVT determination flag F_AT is "1" or not. In the case where the determination is "yes" (CVT vehicle), the flow proceeds to step S335, and in the case where the determination is "no" (MT vehicle), the flow proceeds to step S321.

In step S321, calculation for an air intake passage pressure assistance trigger correction value DPBAST is performed, and the flow proceeds to step S322. This processing is processing for increasing the assistance trigger threshold value, in the case where the 12V power consumption is large, corresponding to the atmospheric pressure.

Figure 9:
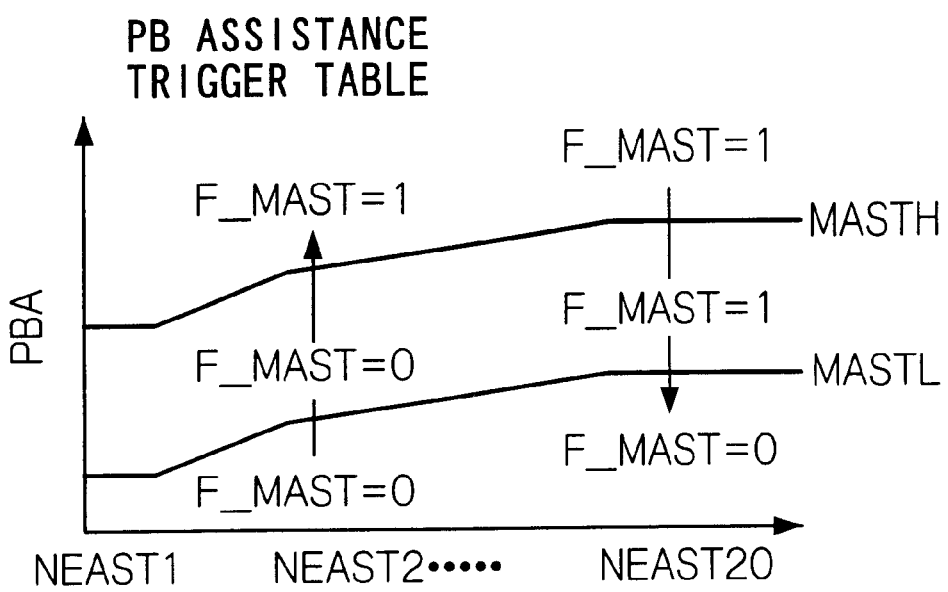
FIG. 9 is a graph showing an air intake passage pressure PB assistance trigger table.

In step S322, the air intake passage pressure assistance trigger threshold value MASTL/H (for MT) is looked up from an air intake passage pressure assistance trigger table, and the flow proceeds to step S323. In this air intake passage pressure assistance trigger table, as shown by two solid lines in FIG. 9, the high air intake passage pressure assistance trigger threshold value MASTH and the low air intake passage pressure assistance trigger threshold value MASTL for determining whether or not the motor assistance is applied at the engine speed NE, are fixed. The arrangement is such that in the looking-up process of step S322, depending on the increase of the air intake passage pressure PBA, or depending on the decrease of the engine speed NE, when the high threshold value line MASTH in FIG. 9 is passed from below to above, the motor assistance determination flag F_MAST is changed from "0" to "1". Conversely, depending on the decrease of the air intake passage pressure PBA, or depending on the increase of the engine speed NE, when the low threshold value line MASTL is passed from above to below, the motor assistance determination flag F_MAST is changed from "1" to "0". Here, FIG. 9 performs switching at each gear and each stoichiometric/lean burn.

In step S323 it is determined whether the motor assistance determination flag F_MAST is "1" or not. In the case where the determination is "yes", the flow proceeds to step S324, and in the case where the determination is "no", the flow proceeds to step S325.

In step S324 the air intake passage assistance trigger threshold value MAST is computed as the sum of the air intake passage pressure assistance trigger low threshold value MASTL looked up in step S322 and the correction value DPBAST computed in step S321, and the flow proceeds to step S326.

In step S325 the air intake passage pressure assistance trigger threshold value MAST is computed as the sum of the air intake passage pressure assistance trigger high threshold value MASTH looked up in step S322 and the correction value DPBAST computed in step S321, and the flow proceeds to step S326.

In step S326, it is determined whether or not the air intake passage pressure current value PBA is greater than or equal to the air intake passage pressure assistance trigger threshold value MAST obtained in step S324 or step S325. In the case where the determination is "yes", the flow proceeds to step S347. In the case where the determination is "no", the flow proceeds to step S327.

In step S327, it is determined whether a departure assistance request flag F_MASTSTR is "1" or not. In the case where the determination is "yes", the flow proceeds to step S347, and in the case where the determination is "no", the flow proceeds to step S330.

Figure 10:
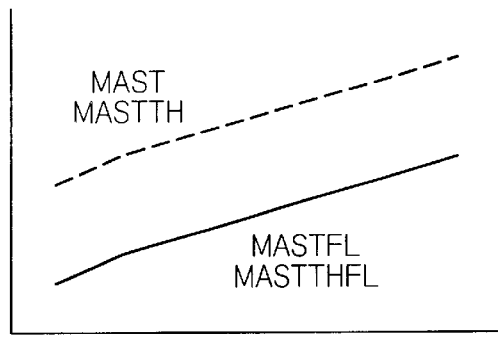
FIG. 10 is a graph showing a table for coefficient computation in FIG. 11.

In step S330, as shown in FIG. 10, the final air intake passage pressure assistance trigger lower limit threshold value MASTFL is obtained by subtracting a predetermined air intake passage pressure delta value #DCRSPB from the above-mentioned air intake passage pressure assistance trigger threshold value MAST, and the flow proceeds to step S331.

Figure 11:
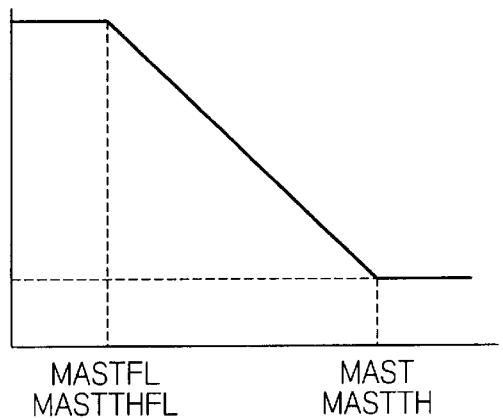
FIG. 11 is a graph showing a KPBRGN/KPBRGTH table.

In step S331 the final air intake passage pressure assistance trigger lower limit threshold value MASTFL and the air intake passage pressure assistance trigger threshold value MAST are interpolated from the air intake passage pressure current value PBA as shown in FIG. 11 to obtain a cruise power generation amount subtraction coefficient table value KPBRGN. In step S332 the cruise power generation amount subtraction coefficient KTRGRGN is set to the cruise power generation amount subtraction coefficient table value KPBRGN, and the flow proceeds to step S333.

In the step S335, the calculation of an air intake passage pressure assistance trigger correction value DPBASTTH is performed, and the flow proceeds to step S336. This processing is processing for increasing the assistance trigger threshold value, in the case where the 12V power consumption is large, corresponding to the atmospheric pressure.

In step S336, the air intake passage pressure assistance trigger threshold value MASTTHL/H (for CVT) is looked up from the air intake passage pressure assistance trigger table, and the flow proceeds to step S337. In this air intake passage pressure assistance trigger table, as shown by two solid lines in FIG. 12, the high air intake passage pressure assistance trigger threshold value MASTTHH and the low air intake passage pressure assistance trigger threshold value MASTTHL for determining whether or not the motor assistance is applied at the vehicle speed VP are fixed.

Figure 12:
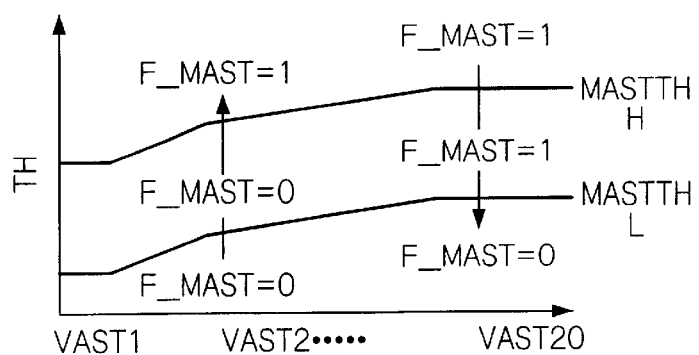
FIG. 12 is a graph showing a MASTTHL/L table.

The arrangement is such that in the looking up process of step S336, depending on the increase of the degree of throttle opening TH, or depending on the decrease of the vehicle speed VP, when the high threshold value line MASTTHH shown in FIG. 12 is passed from below to above, the motor assistance determination flag F_MAST is changed from "0" to "1". Conversely, depending on the decrease of the degree of throttle opening TH, or depending on the increase of the vehicle speed VP, when the low threshold value line MASTTHL is passed from above to below, the motor assistance determination flag F_MAST is changed from "1" to "0". FIG. 12 performs switching at each gear and each stoichiometric/lean burn.

In step S337 it is determined whether the motor assistance determination flag F_MAST is "1" or not. In the case where the determination is "yes", the flow proceeds to step S338, and in the case where the determination is "no", the flow proceeds to step S339.

In step S338 the air intake passage pressure assistance trigger threshold value MASTTH is computed as the sum of the air intake passage pressure assistance trigger low threshold value MASTTHL looked up in step S336 and the correction value DPBASTTH computed in step S335, and the flow proceeds to step S340.

In step S339 the air intake passage pressure assistance trigger threshold value MASTTH is computed as the sum of the air intake passage pressure assistance trigger high threshold value MASTTHH looked up in step S336 and the correction value DPBASTTH computed in step S335, and the flow proceeds to step S340.

In step S340, it is determined whether or not the current value THEM for the degree of throttle opening is greater than or equal to the air intake passage pressure assistance trigger threshold value MASTTH obtained in step S338 or in step S339. In the case where the determination is "yes", the flow proceeds to step S347, and in the case where the determination is "no", the flow proceeds to step S341.

In step S341, it is determined whether the departure assistance request flag F_MASTSTR is "1" or not. In the case where the determination is "yes", the flow proceeds to step S347, and in the case where the determination is "no", the flow proceeds to step S344.

In step S344, as shown in FIG. 10, the final air intake passage pressure assistance trigger lower limit threshold value MASTTHFL is obtained by subtracting a predetermined air intake passage pressure delta value #DCRSTHV from the above-mentioned air intake passage pressure assistance trigger threshold value MASTTH, and the flow proceeds to step S345.

In step S345 the final air intake passage pressure assistance trigger lower limit threshold value MASTTHFL and the air intake passage pressure assistance trigger threshold value MASTTH are interpolated from the current value THEM for the degree of throttle opening as shown in FIG. 11 to obtain the cruise power generation amount subtraction coefficient table value KPBRGTH. In step S346 the cruise power generation amount subtraction coefficient KTRGRGN is set to the cruise power generation amount subtraction coefficient table value KPBRGTH, and the flow proceeds to step S333.

[Departure Assistance Trigger Determination]

Figure 4:
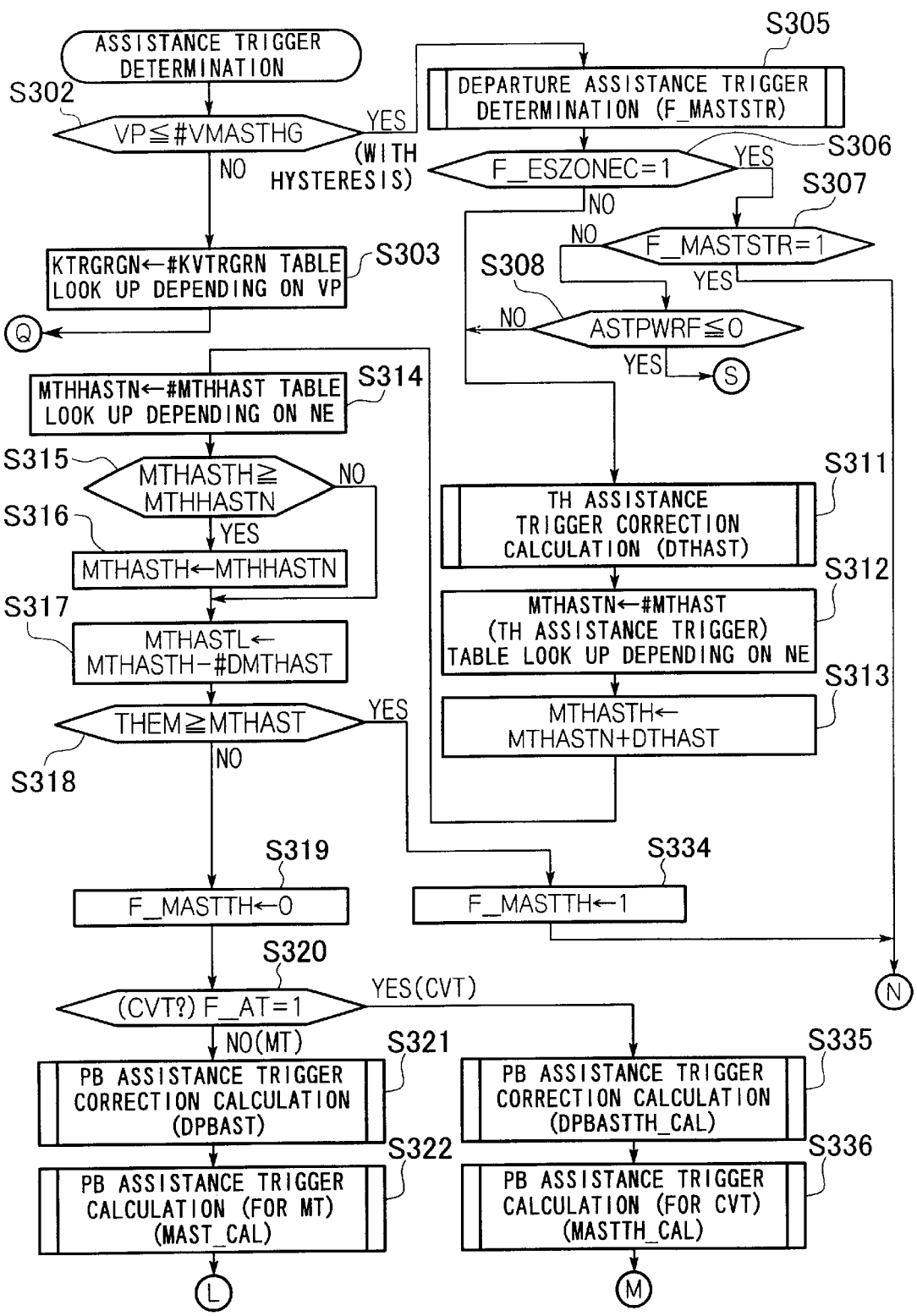
FIG. 4 is a flow chart showing a procedure for assistance trigger determination.
Figure 5:
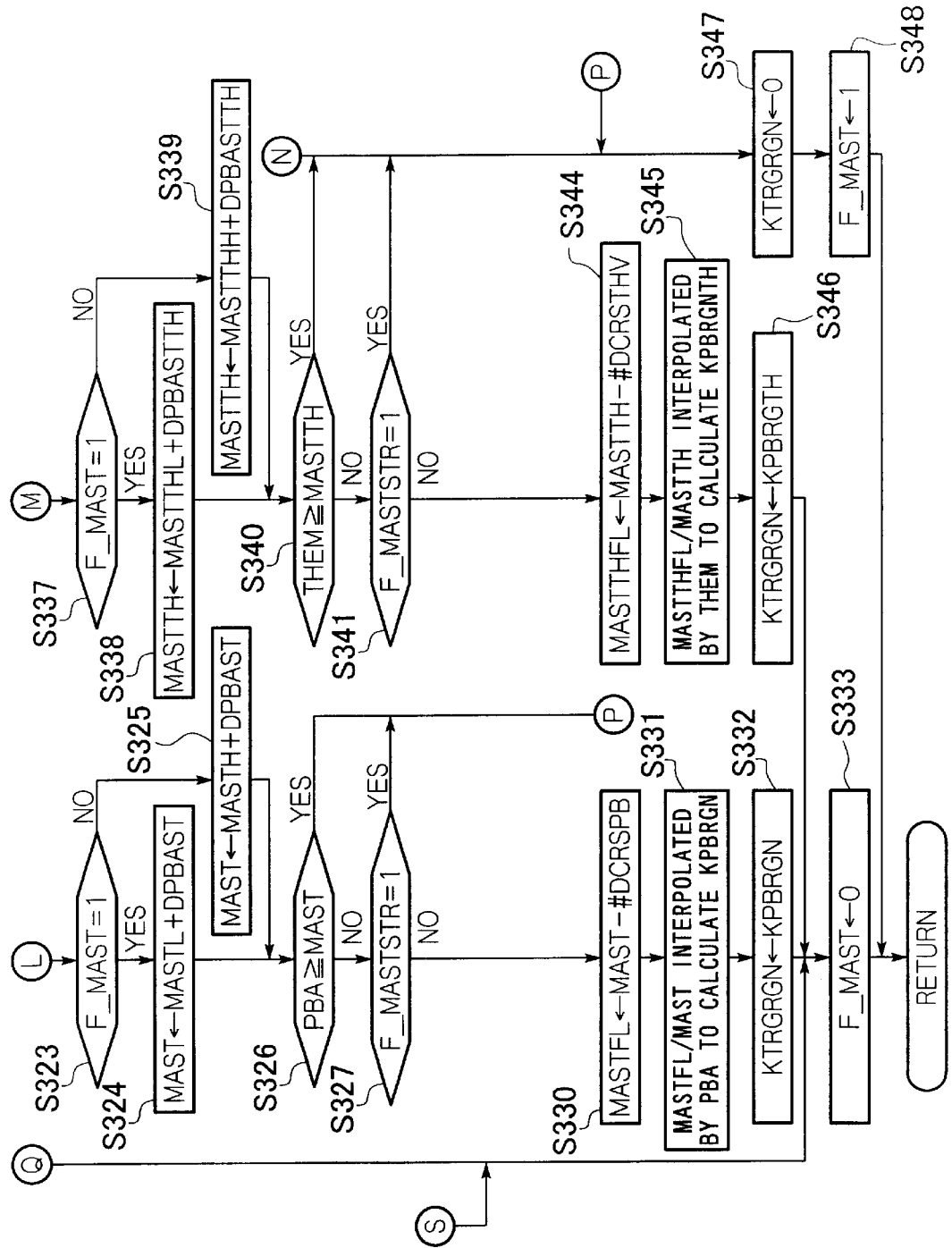
FIG. 5 is a flow chart showing a procedure for assistance trigger determination.
Figure 6:
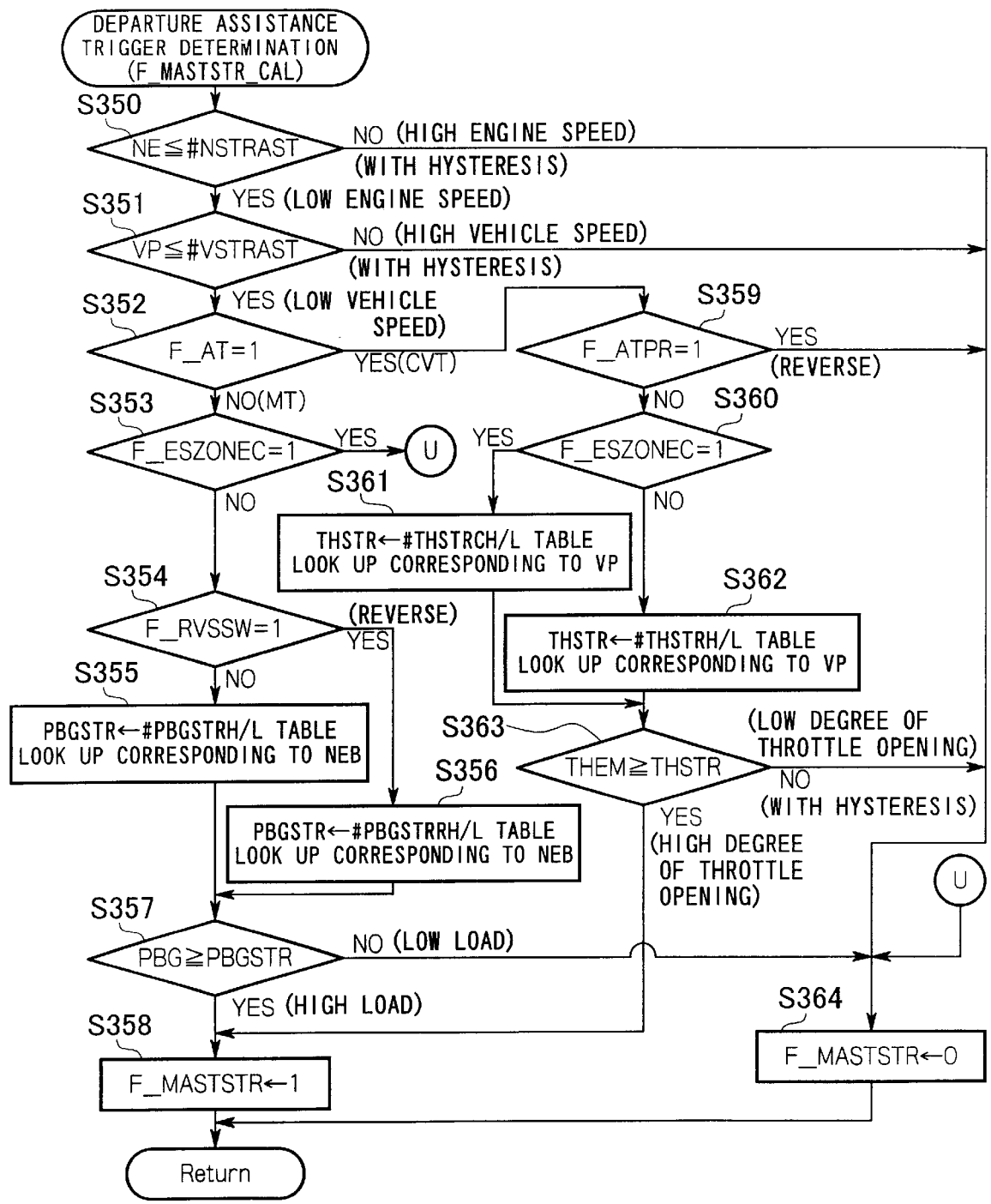
FIG. 6 is a flow chart showing a procedure for departure assistance trigger determination.

FIG. 6 is a flow chart showing departure assistance trigger determination of step S305 in FIG. 4. This processing is repeated at a predetermined cycle time.

In step S350, it is determined whether or not the engine speed NE is less than or equal to a departure assistance execution upper limit value #NSTRAST (predetermined value) (for example a value having hysteresis with a lower limit 800 rpm and upper limit 1000 rpm). In the case where the determination is "no", that is a high engine speed, then in step S364 the departure assistance request flag F_MASTSTR is set to "0", and the processing is repeated thereafter in the same manner.

In step S350, in the case where the determination is "yes", that is low engine speed, then in step S351, it is determined whether or not the vehicle speed VP is less than or equal to a departure assistance execution upper limit vehicle speed #VSTRAST (predetermined value) (for example a value having hysteresis with a lower limit 10 km/h and upper limit 14 km/h). In the case where the determination is "no", that is a high vehicle speed, the flow proceeds to step S364, and in the case where the determination is "yes", that is a low vehicle speed, the flow proceeds to step S352.

In step S352, it is determined whether a MT/CVT determination flag F_AT is "1" or not. In the case where the determination is CVT vehicle, the flow proceeds to step S359, and in the case where the determination in step S352 is MT vehicle, the flow proceeds to step S353.

In step S353, it is determined whether the energy storage zone C flag is "1" or not. In the case where the determination is "yes", the flow proceeds to step S364, and in the case where the determination is "no", the flow proceeds to step S354.

In step S354, it is determined whether a reverse switch flag F_RVSSW is "1" or not. In the case where the determination is "yes" (reverse position), the flow proceeds to step S356, and in the case where the determination is "no" (other than reverse position), the flow proceeds to step S355.

In step S355, a departure assistance execution air intake passage pressure lower limit value PBGSTR corresponding to the engine speed NEB is obtained as a value having hysteresis by table look up (table look up for #PBGSTRH/L), and the flow proceeds to step S357. In step S356, the departure assistance execution air intake passage pressure lower limit value PBGSTR corresponding to the engine speed NEB is obtained as a value having hysteresis by table look up (table look up for #PBGSTRRH/L), and the flow proceeds to step S357.

In step S357, it is determined whether the air intake passage pressure PBG is greater than or equal to the departure assistance execution air intake passage pressure lower limit PBGSTR or not. In the case where the determination is "no", that is low load, the flow proceeds to step S364, and in the case where the determination is "yes", that is high load, the flow proceeds to step S358.

In step S358, the departure assistance request flag F_MASTSTR is set to "1", and the above processing is repeated.

In step S359, it is determined whether a CVT vehicle reverse position determination flag F_ATPR is "1" or not. In the case where the determination is "yes" (reverse position), the flow proceeds to step S364, and in the case where the determination is "no" (other than reverse position), the flow proceeds to step S360.

In step S360, it is determined whether an energy storage zone C flag F_ESZONEC (remaining charge is less than around 20%) is "1" or not. In the case where the determination is "yes", the flow proceeds to step S361, and in the case where the determination is "no", the flow proceeds to step S362.

Figure 13:
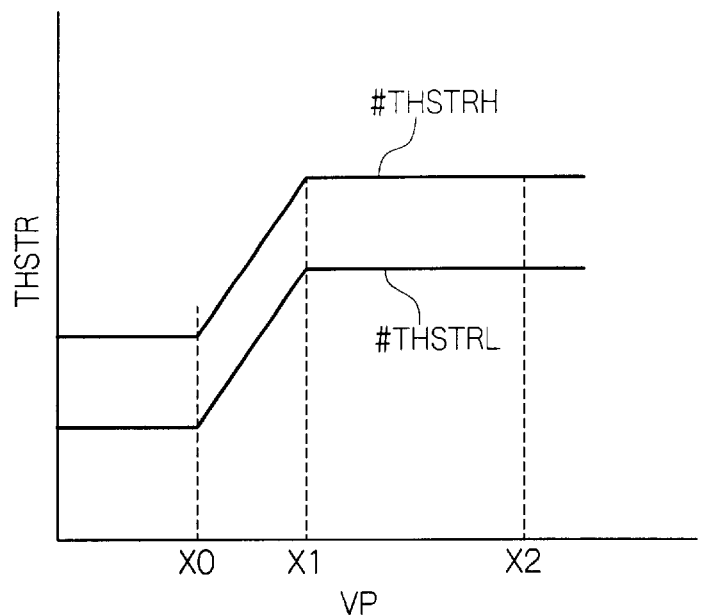
FIG. 13 is a graph showing a THSTRH/L table.

In step S362, a departure assistance execution degree of throttle opening lower limit value THSTR (departure assistance determination threshold value) corresponding to vehicle speed VP as shown in FIG. 13, is obtained as a value having hysteresis, by table look up (table look up for #THSTRH/L), and the flow proceeds to step S363.

Figure 14:
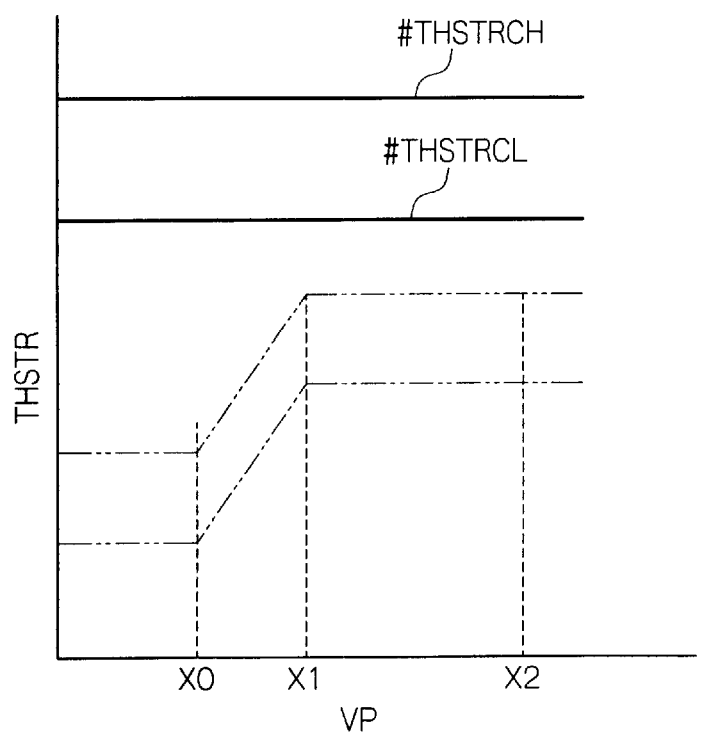
FIG. 14 is a graph showing a THSTRCH/L table.

In step S361, a departure assistance execution degree of throttle opening lower limit value THSTR corresponding to vehicle speed VP as shown in FIG. 14, is obtained as a value having hysteresis, by table look up (table look up for #THSTRCH/L), and the flow proceeds to step S363. Here the determination lines of FIG. 14 can be variously selected. In FIG. 14, the lines of FIG. 13 are shown as dotted lines for comparison.

Here, as shown in FIG. 14, in the case where the remaining battery charge SOC is in zone C, an opening greater than the degree of throttle opening shown by the dotted line (the line of FIG. 13) is set irrespective of vehicle speed VP.

That is, in the case where in a CVT vehicle, the remaining battery charge SOC is in zone C (at the time of discharge suppression mode), the departure assistance execution degree of throttle opening lower limit value THSTR is set. However this threshold value becomes a value greater than the departure assistance execution degree of throttle opening lower limit value THSTR for the case where the remaining battery charge SOC is greater than this (at the time of discharge and charge permit mode). Consequently, only in the case where the driver truly wants to accelerate does departure assistance result. Therefore the remaining battery charge SOC can be prevented from decreasing further.

In step S363, it is determined whether or not the current value THEM for the degree of throttle opening is greater than or equal to the departure assistance execution degree of throttle opening lower limit value THSTR. In the case where the determination is "no", that is low opening, the flow proceeds to step S364, and in the case where the determination is "yes", that is high opening, the flow proceeds to step S358.

In this way, an acceleration performance which promptly responds to the acceleration intention of the driver at the time of departure can be obtained. Especially in the case of a CVT vehicle, even in the case where the remaining battery charge is low, departure assistance corresponding to the depression amount of the accelerator pedal by the driver is possible, and the driver does not experience a sensation of sluggish departure. Consequently, the driver no longer depresses the accelerator pedal more than necessary on each occasion of departure, thus contributing to an improvement in fuel consumption.

[Departure Assistance Computation Processing]

Figure 7:
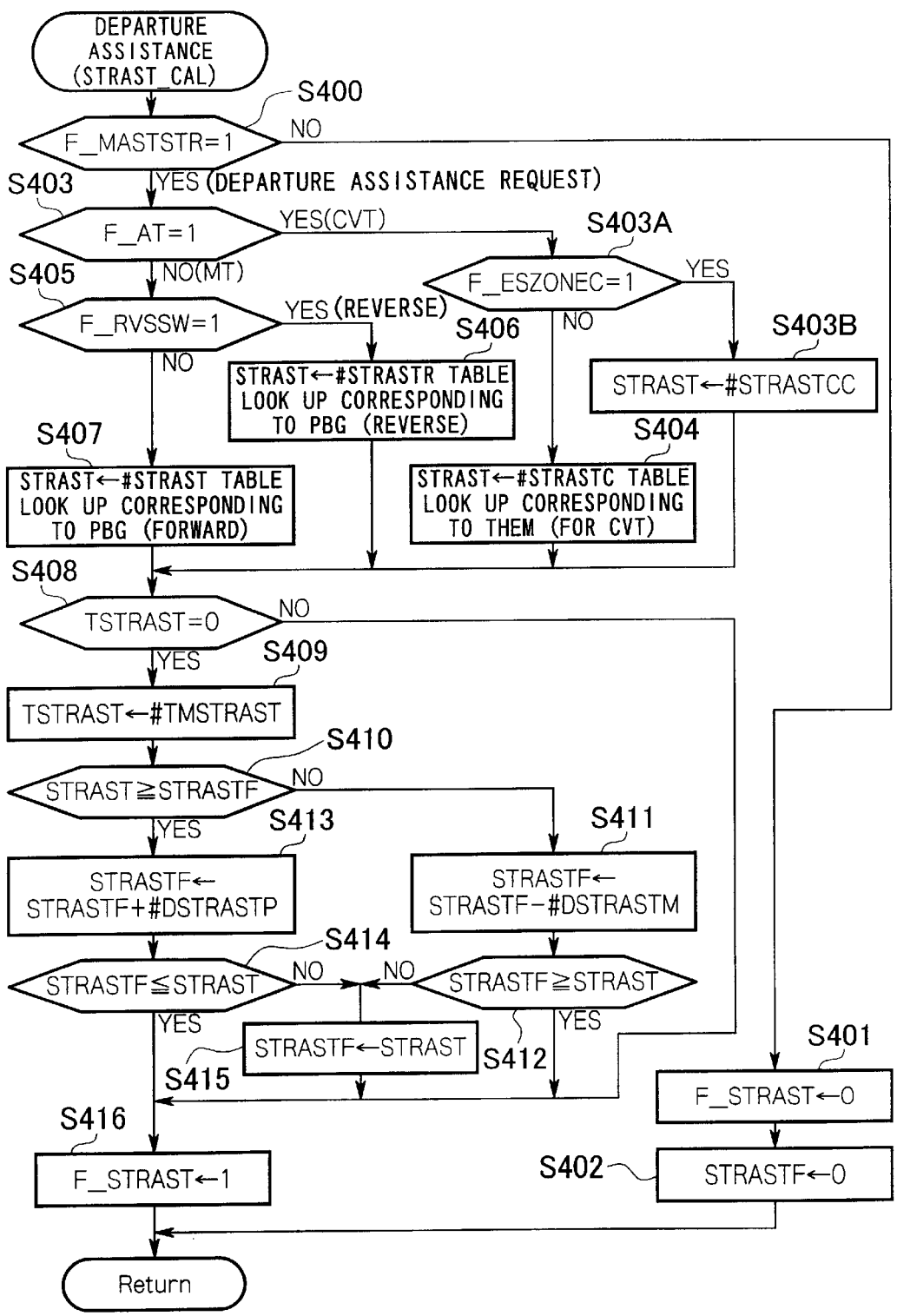
FIG. 7 is a flow chart showing a procedure for departure assistance.

FIG. 7 is a flow chart of departure assistance computation processing, which sets the assistance amount for mainly at the time of departure assistance. This processing is repeated at a predetermined cycle time.

In step S400, it is determined whether a departure assistance request flag F_MASTSTR is "1" or not. In the case where the determination is "no", that is there is no departure assistance request, the flow proceeds to step S401, a departure assistance permit flag F_STRAST is set to "0", a departure assistance final computation value STRASTF is set to "0", and the above-mentioned processing is repeated.

In step S400, in the case where the determination is "yes", that is there is a request for departure assistance, the flow proceeds to step S403.

In step S403, it is determined whether an MT/CVT determination flag is "1" or not. In the case where the determination is "yes" (CVT vehicle), the flow proceeds to step S403A, and in the case where the determination is "no" (MT vehicle), the flow proceeds to step S405.

In step S405, it is determined whether a reverse switch flag F_RVSSW is "1" or not. In the case where the determination is "yes" (reverse position), the flow proceeds to step S406, and in the case where the determination is "no" (other than reverse position), the flow proceeds to step S407.

In step S407, a departure assistance computation value STRAST corresponding to air intake passage pressure PBG is computed by #STRAST table look up, and the flow proceeds to step S408.

In step S406, the departure assistance computation value STRAST corresponding to air intake passage pressure PBG is computed by #STRASTR table look up, and the flow proceeds to step S408.

In step S408, it is determined whether a gradually increasing/gradually decreasing timer TSTRAST is "0" or not. If not "0", the flow proceeds to step S416, and if "0", the flow proceeds to step S409.

In step S409, the gradually increasing/gradually decreasing timer TSTRAST is set to a predetermined value #TMSTRAST (for example 50 ms), and the flow proceeds to step S410.

In step S410, it is determined whether or not a departure assistance computation value STRAST is greater than or equal to a departure assistance final computation value STRASTF. In the case where the determination in step S410 is "yes", that is, it is determined that the departure assistance computation value STRAST≧ the departure assistance final computation value STRASTF, then in step S413, a gradually increasing term #DSTRASTP (for example 0.3 KW) is added to the departure assistance final computation value STRASTF, and the flow proceeds to step S414.

In step S414, it is determined if the departure assistance final computation value STRASTF is less than or equal to the departure assistance computation value STRAST. In the case where the determination in step S414 is "yes", that is, it is determined that the departure assistance final computation value STRASTF≦the departure assistance computation value STRAST, then in step S416, the departure assistance permit flag F_STRAST is set to "1" , and the above-mentioned processing is repeated.

In the case where the determination in step S414 is "no", that is, it is determined that the departure assistance final computation value STRASTF>the departure assistance computation value STRAST, then in step S415, the departure assistance final computation value STRASTF is set to the departure assistance computation value STRAST, and the flow proceeds to step S416.

In the case where in step S410 the determination is "no", that is, it is determined that the departure assistance computation value STRAST<the departure assistance final computation value STRASTF, then in step S411 a gradually decreasing term #DSTRASTM (for example 0.3 KW) is subtracted from the departure assistance final computation value STRASTF, and in step S412, it is determined whether or not the departure assistance final computation value STRASTF is greater than or equal to the departure assistance computation value STRAST.

In the case where in step S412 the determination is "yes", that is, it is determined that the departure assistance final computation value STRASTF≧ the departure assistance computation value STRAST, the flow proceeds to step S416. In the case where the determination in step S412 is "no", that is, it is determined that the departure assistance final computation value STRASTF<the departure assistance computation value STRAST, the flow proceeds to step S415.

In step S403A, it is determined whether the energy storage zone C flag F_ESZONEC (remaining charge less than around 20%) is "1" or not. In the case where the determination is "yes", the flow proceeds to step S403B, and in the case where the determination is "no", the flow proceeds to step S404.

Figure 15:
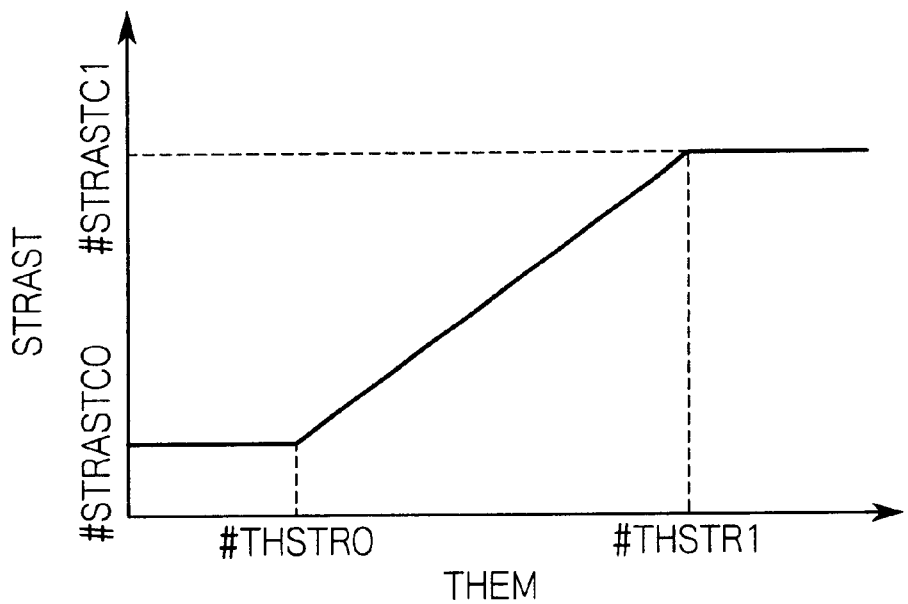
FIG. 15 is a graph showing a STRASTC table.

In step S404, the departure assistance computation value STRAST corresponding to the current value THEM for the degree of throttle opening shown in FIG. 15 is computed by table look up (table look up for #STRASTC), and the flow proceeds to step S408.

Figure 16:
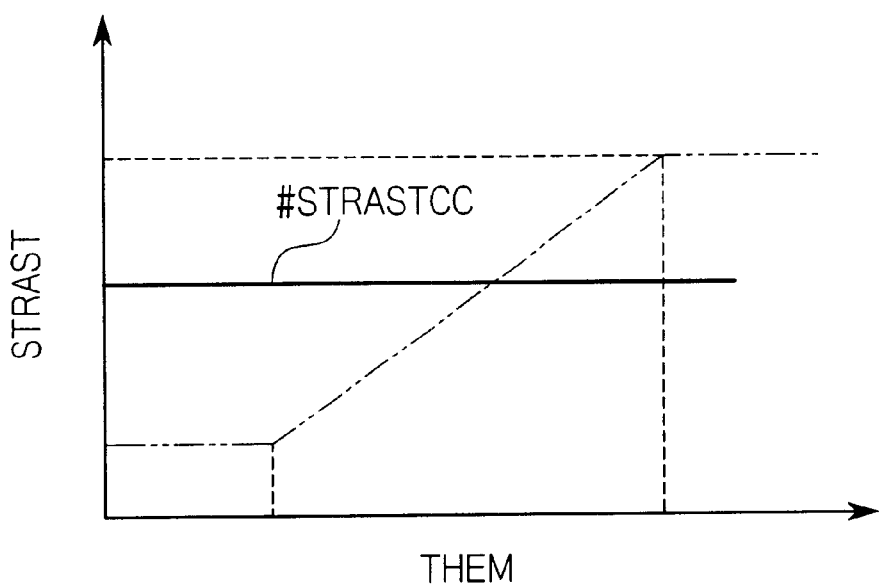
FIG. 16 is a graph showing departure assistance amount at the time of low remaining battery charge.

In step S403B, the departure assistance computation value STRAST is set to an assistance value #STRASTCC (in this embodiment a constant value 4 KW) determined from the current value THEM for the degree of throttle opening as shown in FIG. 16, and the flow proceeds to step S408. Here, in FIG. 16 the line of FIG. 15 is jointly shown as a dotted line. Consequently, the assistance value #STRASTCC in the discharge suppression mode where the remaining battery charge SOC is in zone C is constant. Hence compared to FIG. 15, assistance at a necessary assistance value can be maintained from immediately after the accelerator pedal is depressed.

The above-mentioned assistance value #STRASTCC may be not a constant value, and a value obtained by table look up corresponding to the current value THEM for the degree of throttle opening may be used. However, in this case it is preferable that a departure assistance amount above a predetermined value (which can be variously set corresponding to the engine output characteristics or the motor output characteristics) is maintained from immediately after departure. Furthermore, the assistance amount #STRASTCC may be changed and set corresponding to accelerator pedal opening instead of the above-mentioned degree of throttle opening.

Consequently, since the departure assistance amount is gradually increased and gradually decreased for each time set by a timer, then a smooth acceleration feeling without shock is imparted, and shock when leaving the assistance condition can be eliminated. Furthermore, in the case of a CVT vehicle, even in the case where the remaining battery charge SOC is in zone C, a departure assistance amount determined from the degree of throttle opening is set, and corresponds to the acceleration intention of the driver at the time of departure.

In the above-mentioned embodiments, even in the case where basically the remaining battery charge SOC of the battery 3 is in the zone C discharge (i.e., suppression mode), at the time of departure the acceleration intention of the driver can be precisely reflected, so that the vehicle can be made to depart quickly. Consequently, even with a CVT installed vehicle which is disadvantageous from the point of acceleration sensation at the time of departure, a smooth departure is possible without giving an unpleasant sensation to the driver.

Moreover, in the CVT vehicle, at the time of the discharge suppression mode where the remaining battery charge SOC is in zone C, the departure assistance execution degree of throttle opening lower limit value THSTR is set. However this value becomes a value greater than the departure assistance execution degree of throttle opening lower limit value THSTR for at the time of the discharge and charge permit mode for where the remaining battery charge SOC is larger than this.

Consequently, at the time of the discharge suppression mode, assistance by the motor M is performed only at the time of departure, and departure assistance results only in the case where the driver truly wishes to accelerate. Therefore a further reduction in the remaining battery charge can be suppressed, and problems from the point of energy management do not arise.

Furthermore, since the assistance amount for at the time of departure during the discharge suppression mode is determined from the degree of throttle opening, then a departure assistance amount greater than or equal to a predetermined value can be used from immediately after the accelerator pedal is depressed. Consequently the engine can be promptly assisted corresponding to the acceleration intention of the driver. As a result, the accelerator pedal is not depressed more than necessary at the time of departure, and hence this can contribute to an improvement in fuel consumption.

Moreover, since in order to permit the departure assistance, the engine speed NE being less than or equal to the departure assistance execution upper limit #NSTRAST, and the vehicle speed VP being less than or equal to an assistance execution upper limit vehicle speed #VSTRAST are set as the necessary conditions, then departure assistance can be executed only at the time of departure. Consequently, a reduction in remaining battery charge SOC of the battery 3 due to departure assistance can be kept to a minimum.

The present invention is not limited to the above-mentioned embodiments, and for example for the automatic transmission vehicle, a so-called AT vehicle is applicable, in addition to a CVT vehicle.

What is claimed is:

1. A control apparatus for a hybrid vehicle with an engine and a motor as the drive sources of the vehicle, and a power storage unit for storing electrical energy from the output of the engine or a part of the kinetic energy of the vehicle which has been converted by the motor, and an automatic transmission, comprising:

a charge condition detection section which detects the charge amount of the power storage unit and determines a mode including at least a charge and discharge permit mode which permits charge and discharge of the power storage unit, and a discharge suppression mode which permits charge and suppresses discharge of the power storage unit; and an assistance determination section which determines whether or not to perform driving force assistance for the engine by the motor, wherein the assistance determination section has at least a departure assistance determination section which determines departure assistance that performs driving force assistance by the motor at the time of departure of the vehicle, and an acceleration assistance determination section which determines acceleration assistance that performs driving force assistance by the motor at the time of acceleration of the vehicle, and the departure assistance determination section determines to not permit assistance in the case where the charge condition detection section determines the discharge suppression mode and determines discharge suppression time permit determination which permits assistance in the discharge suppression mode, and in the case where driving force assistance by the motor is permitted by the discharge suppression time permit determination, the departure assistance is performed by the motor even in the discharge suppression mode.

2. A control apparatus for a hybrid vehicle according to claim 1, wherein the discharge suppression time permit determination by the departure assistance determination section, determines a degree of throttle opening corresponding to an acceleration intention of a driver, and permits the departure assistance in the case where the degree of throttle opening corresponding to the acceleration intention exceeds a predetermined determination threshold value which is greater than a departure assistance determination threshold value for at the time of the charge and discharge permit mode.

3. A control apparatus for a hybrid vehicle according to claim 1, wherein an assistance amount for the departure assistance in the discharge suppression mode is determined by a degree of throttle opening or a depression amount of an accelerator pedal.

4. A control apparatus for a hybrid vehicle according to claim 1, wherein the assistance determination section determines the departure assistance when, based on at least engine speed and vehicle speed, the engine speed is less than or equal to a predetermined value, and the vehicle speed is less than or equal to a predetermined value.

5. A control apparatus for a hybrid vehicle according to claim 1, wherein in the case where the charge condition detection section determines the discharge suppression mode, the acceleration assistance determination section determines that the driving force assistance by the motor is not performed.

6. A control apparatus for a hybrid vehicle according to claim 1, wherein an assistance amount for the departure assistance in the discharge suppression mode is a constant value.

* * * * *